US012806483B2

(12) United States Patent
Zhang et al.

(10) Patent No.: US 12,806,483 B2
(45) Date of Patent: Nov. 24, 2026

(54) TENNIS BALL-PICKING ROBOT

(71) Applicant: Potent Sports & Tech Co., Ltd, Nantong (CN)

(72) Inventors: Yong Zhang, Nantong (CN); Feixiang Zhou, Nantong (CN); Wei Wang, Nantong (CN); Guoxin Tang, Nantong (CN)

(73) Assignee: Potent Sports & Tech Co., Ltd, Nantong (CN)

( * ) Notice: Subject to any disclaimer, the term of this patent is extended or adjusted under 35 U.S.C. 154(b) by 167 days.

(21) Appl. No.: 18/824,963

(22) Filed: Sep. 5, 2024

(65) Prior Publication Data

US 2024/0424355 A1 Dec. 26, 2024

(30) Foreign Application Priority Data

May 17, 2024 (CN) ........................ 202410614100.7

(51) Int. Cl.

| | |
|---|---|
| ***A63B 47/02*** | (2006.01) |
| ***G05D 1/246*** | (2024.01) |
| ***G05D 1/648*** | (2024.01) |
| *A63B 102/02* | (2015.01) |
| *G05D 105/60* | (2024.01) |
| *G05D 107/20* | (2024.01) |

(52) U.S. Cl.

CPC ........... *A63B 47/021* (2013.01); *G05D 1/246* (2024.01); *G05D 1/648* (2024.01); *A63B 2047/022* (2013.01); *A63B 2102/02* (2015.10); *G05D 2105/60* (2024.01); *G05D 2107/24* (2024.01)

(58) Field of Classification Search

None

See application file for complete search history.

(56) References Cited

U.S. PATENT DOCUMENTS

| | | | |
|---|---|---|---|
| 2019/0034727 | A1 | 1/2019 | Chihara et al. |
| 2021/0138311 | A1 | 5/2021 | Wang et al. |
| 2023/0381953 | A1 | 11/2023 | Tanaami et al. |

OTHER PUBLICATIONS

CN 110575653 A & English Translation (Year: 2019).*

* cited by examiner

*Primary Examiner* — Reginald S Tillman, Jr.

(74) *Attorney, Agent, or Firm* — Hemisphere Law, PLLC

(57) ABSTRACT

The present disclosure discloses a tennis ball-picking robot, including a chassis assembly, a ball-entering control element group, and a ball-collecting mechanism, the ball-entering control element group being disposed on a front end of the chassis assembly and the ball-collecting mechanism being disposed on a rear side of the chassis assembly. The tennis ball-picking robot incorporates multiple AI technologies such as computer vision, simultaneous localization and mapping, and robotics kinematics, enabling intelligent following, mapping and localization, and path planning. The robot can efficiently collect the tennis balls dropped on the court, and the players can also select a ball-picking area and a ball-picking speed pattern of the robot through an APP, improving the ball-picking efficiency, avoiding consuming the physical power of the players due to manual picking, improving the training effect by ultimately ensuring their focus during training, and reducing the training cost.

11 Claims, 10 Drawing Sheets

TENNIS BALL-PICKING ROBOT

TECHNICAL FIELD

The present disclosure relates to tennis training equipment, in particular to a tennis ball-picking robot.

BACKGROUND OF THE INVENTION

The traditional way of picking up tennis balls is usually to manually pick them up after training, which consumes a lot of time and energy. There are a few auxiliary ball-picking mechanisms on the market, but their price positioning is relatively high, and their degree of intelligence is relatively insufficient. Moreover, they also require the installation of high-definition camera systems on the net posts of the tennis balls to track and locate the balls, which brings inconvenience to users in terms of mobility.

SUMMARY OF THE INVENTION

In order to solve the problem of relatively outdated tennis ball-picking equipment, this disclosure provides a tennis ball-picking robot that offers intelligent and convenient ball-picking options, allowing players to focus on their training and devote more time and energy to improving their own qualities and skills, thereby ensuring the sustainability and continuity of training.

The present disclosure provides the following technical solutions: a tennis ball-picking robot includes a chassis assembly, a ball-entering control element group and a ball-collecting mechanism, the ball-entering control element group being disposed on a front end of the chassis assembly and the ball-collecting mechanism being disposed on a rear side of the chassis assembly, the chassis assembly including a walking assembly that moves the tennis robot through the chassis assembly.

In some embodiments, the tennis ball-picking robot includes a control system, the chassis assembly, the ball-entering control element group and the ball-collecting mechanism are connected with the control system; and the tennis ball-picking robot further includes a display assembly connected with the control system.

In some embodiments, the ball-entering control element group includes a longitudinal mounting bracket, a transverse mounting bracket, a ball-entering ramp, ball-guiding parts, ball-entering motors, and ball-entering impellers, the longitudinal mounting bracket is fixed on the chassis assembly, the transverse mounting bracket is fixed at a front upper end of the longitudinal mounting bracket, the ball-entering ramp is arranged inside the longitudinal mounting bracket, and the ball-entering ramp is fixed with the chassis assembly, two ball-guiding parts are provided, which are fixed left and right on two sides of the longitudinal mounting bracket, respectively, two ball-entering motors are provided, which are fixed left and right on the transverse mounting bracket, respectively, and output shafts of the ball-entering motors are extended under the longitudinal mounting bracket after passing through through holes in the longitudinal mounting bracket, respectively, and two ball-entering impellers are provided, which are fixed with the output shafts of the ball-entering motors arranged left and right respectively, and the ball-entering motors are connected with the control system; and the ball-entering impeller is designed in a recess shape between blades, and a plurality of blades are equidistantly distributed on the outside of the ball-entering impeller.

In some embodiments, the ball-entering control element group includes a camera assembly and a radar, the camera assembly is fixed at an upper front end of the transverse mounting bracket, the radar is fixed at a top end of the transverse mounting bracket, both the radar and the camera assembly are connected with the control system; the tennis picking robot has one or more of the following functions: following operation, mapping and localization, and path planning; and the control system includes a data processing module, the data processing module collects data of a field and obstacles on the field through the camera assembly and the radar, analyzes the data to acquire the clustered state of scattered tennis balls on a site, and plans a current ball-picking path for the tennis ball-picking robot, and the control system controls the walking assembly to operate according to the current ball-picking path for the tennis ball-picking robot.

In some embodiments, a midpoint between the two ball-entering impellers is set as a midpoint A, the two ball-entering impellers are symmetrically distributed about the midpoint A, a distance between blades on the two ball-entering impellers is greater than or equal to 62 mm; the distance between recesses of the two ball-entering impellers is greater than or equal to 68 mm; and the ball-guiding part includes a second connecting bar, a movable arm and an auxiliary guiding plate, wherein a rear side of the second connecting bar is provided with a reserved hole, and a bolt passes through the reserved hole and is inserted into the longitudinal mounting bracket; the auxiliary guiding plate is arranged on the second connecting bar to avoid the ball-entering impeller, and a lower part of a front side of the second connecting bar is provided with a sensing device to avoid the auxiliary guiding plate, a front end of the second connecting bar is hinged with the movable arm, and a hinged position is provided with a rebound assembly, a limiting assembly and a micro switch, a front end of the movable arm is provided with a side wheel, and the micro switch is connected with the control system.

In some embodiments, the limiting assembly includes an arc-shaped groove opened at a rear end of the movable arm, a pressing column arranged at the front end of the second connecting bar, and a spring plunger, the pressing column is arranged above the spring plunger, the bottom of the pressing column is connected with the top of the spring plunger, and the bottom of the spring plunger penetrates the second connecting bar and extends into the arc-shaped groove; and the movable arm is provided with a roller.

In some embodiments, the ball-collecting mechanism includes a ball-collecting frame, a lifting tray and a lift control assembly, both the lifting tray and the lift control assembly being disposed within the ball-collecting frame, the lift control assembly being used for controlling lifting and lowering of the lifting tray, the lift control assembly being connected with the control system.

In some embodiments, the lift control assembly includes bushings, guide shafts, compression springs, an electromagnetic suction plate, a metal magnetic sheet, and rubber pressure sensor contact pins, the lifting tray is movably disposed within the ball-collecting frame, four bushings are provided, which are fixed at four corners of the lifting tray, respectively, four guide shafts are provided, which are movably threaded in four bushings in one-to-one correspondence, respectively, the guide shafts are fixed on the ball-collecting frame, the guide shafts are movably sleeved with the compression springs, the compression springs are located below the bushings, the electromagnetic suction plate is fixed in an opening in a central position of the ball-collecting frame, the metal magnetic sheet is fixed at the bottom of the lifting tray in a position above the electromagnetic suction plate, four rubber pressure sensor contact pins are provided, which are respectively disposed at the bottom four corners of the ball-collecting frame, and the rubber pressure sensor contact pins are disposed in contact with four pressure sensors respectively disposed inside the chassis assembly, the pressure sensors and the electromagnetic suction plate are connected with the control system.

In some embodiments, the ball-collecting frame is movably disposed in a groove on a rear side of the chassis assembly, the ball-collecting frame is detachable from the chassis assembly; the number and size of compression springs sleeving the four guide shafts are the same; the bushing is a graphite bushing; and the pressure sensor is a resistive thin film pressure sensor.

In some embodiments, the chassis assembly includes a chassis, the walking assembly includes driving wheel sets, two driving wheel sets are provided, which are arranged left and right at a front end of the chassis, respectively, and the driving wheel set is connected with the control system; and the tennis ball-picking robot includes a power supply module, and the power supply module is connected with the control system.

The tennis ball-picking robot implements intelligent ball-picking through the control system.

Compared to the existing technology, the beneficial effects of this disclosure are as follows: the tennis ball-picking robot of this disclosure enhances the ball-picking efficiency, and eliminates the need for manual picking which otherwise consumes the energy of players, thereby maximizing the concentration of players during training and ultimately improving their training outcomes. Furthermore, it can utilize the ball-collecting mechanism to arrange the tennis balls in a three-dimensional space, further boosting the performance of the tennis ball-picking robot.

Figure 1:
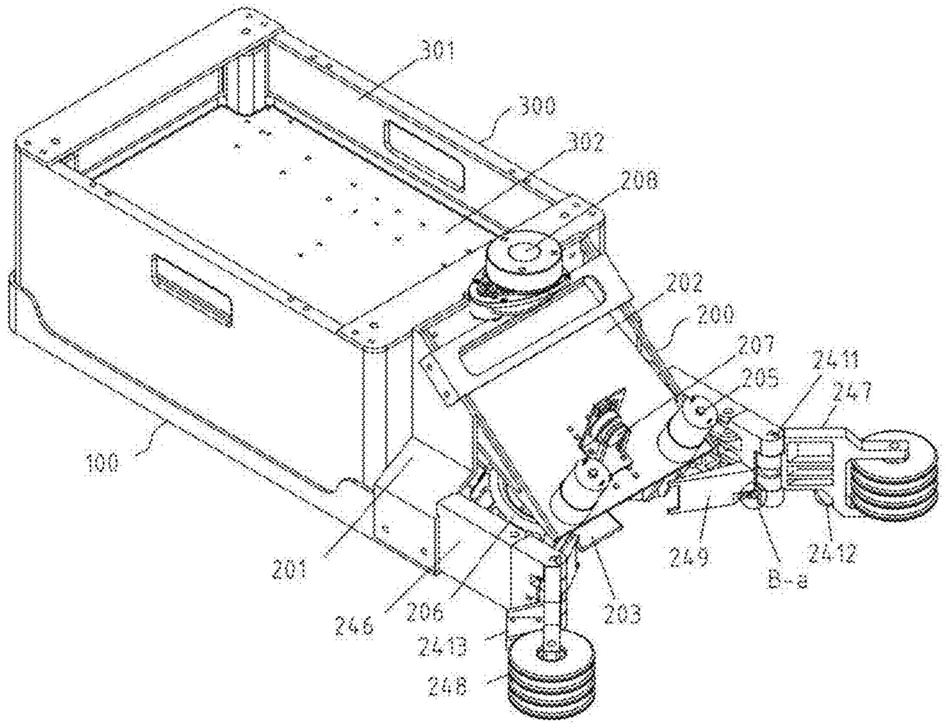
FIG. 1 is a schematic structural diagram of a tennis ball-picking robot according to some embodiments of the present disclosure.
Figure 2:
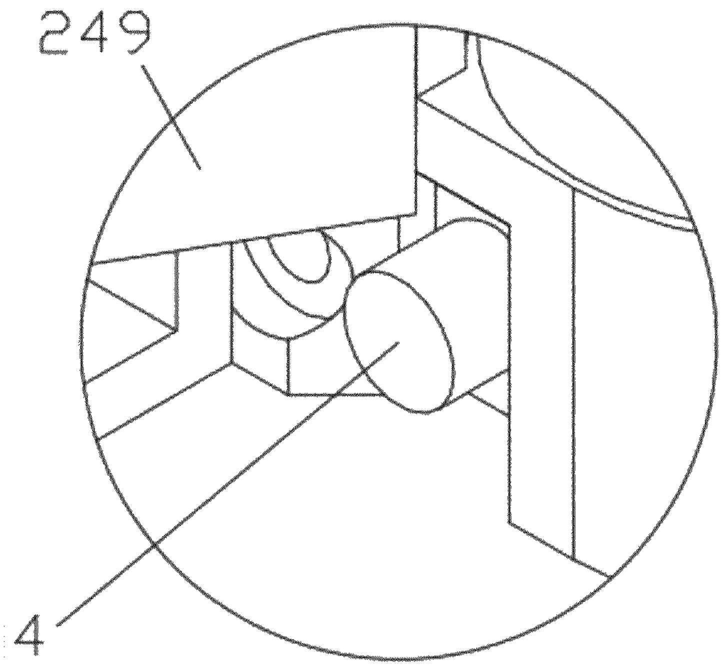
FIG. 2 is an enlarged view of a portion B-a of FIG. 1.
Figure 3:
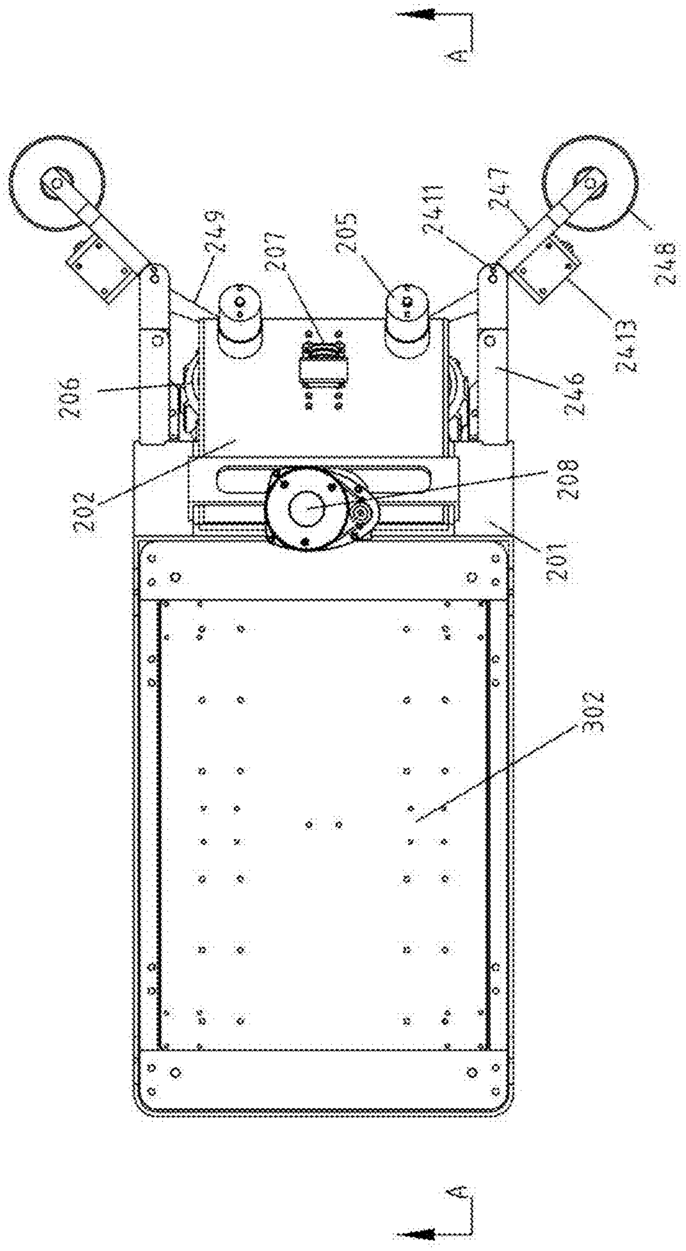
FIG. 3 is a top view of a tennis ball-picking robot according to some embodiments of the present invention.

In the drawings: chassis assembly 100, ball-entering control element group 200, ball-collecting mechanism 300, chassis 101, driving wheel set 103, longitudinal mounting bracket 201, transverse mounting bracket 202, ball-entering ramp 203, connecting bar 246, first segment 2461, second segment 2462, movable arm 247, side wheel 248, auxiliary guiding plate 249, micro switch 2410, pressing column 2411, roller 2412, auxiliary connecting seat 2413, ball-entering motor 205, ball-entering impeller 206, camera assembly 207, radar 208, ball-collecting frame 301, lifting tray 302, bushing 303, guide shaft 304, compression spring 305, electromagnetic suction plate 306, metal magnetic sheet 307, rubber pressure sensor contact pin 308, sensing device 4.

DETAILED DESCRIPTION OF THE INVENTION

The technical solutions in the embodiments of the present disclosure will be clearly and completely described below in conjunction with the accompanying drawings in the embodiments of the present disclosure, it is obvious that the described embodiments are only a part of the embodiments of the present disclosure, rather than all of the embodiments. Based on the embodiments in the present disclosure, all other embodiments obtained by those of ordinary skill in the art without making inventive labor, belong to the scope of protection of the present disclosure.

Referring to FIGS. 1-7, the tennis ball-picking robot of the present disclosure includes a chassis assembly 100, a ball-entering control element group 200 and a ball-collecting mechanism 300, the ball-entering control element group 200 being disposed on a front end of the chassis assembly 100 and the ball-collecting mechanism 300 being disposed on a rear side of the chassis assembly 100. The chassis assembly 100 includes a chassis 101 and driving wheel sets 103, two driving wheel sets 103 are provided, which are arranged left and right at a front end of the chassis 101, respectively, and an omni-directional wheel can be arranged on the bottom of the chassis 101 to further facilitate the movement of the chassis and the articles thereon.

The ball-entering control element group 200 includes a longitudinal mounting bracket 201, a transverse mounting bracket 202, a ball-entering ramp 203, ball-guiding parts, ball-entering motors 205, ball-entering impellers 206, a camera assembly 207, and a radar 208, the longitudinal mounting bracket 201 is fixed on the chassis 101, the transverse mounting bracket 202 is fixed at a front upper end of the longitudinal mounting bracket 201, the ball-entering ramp 203 is arranged inside the longitudinal mounting bracket 201, and the ball-entering ramp 203 is fixed with the chassis 101, two ball-guiding parts are provided, which are fixed left and right on two sides of the longitudinal mounting bracket 201, respectively, two ball-entering motors 205 are provided, which are fixed left and right on the transverse mounting bracket 202, respectively, and output shafts of the ball-entering motors 205 are extended under the longitudinal mounting bracket 201 after passing through through holes in the longitudinal mounting bracket 201, respectively, and two ball-entering impellers 206 are provided, which are connected with the output shafts of the ball-entering motors 205 arranged left and right respectively, the camera assembly 207 is fixed at an upper front end of the transverse mounting bracket 202, and the radar 208 is fixed at a top end of the transverse mounting bracket 202.

The ball-collecting mechanism 300 includes a ball-collecting frame 301, a lifting tray 302, bushings 303, guide shafts 304, compression springs 305, an electromagnetic suction plate 306, a metal magnetic sheet 307, and rubber pressure sensor contact pins 308, the ball-collecting frame 301 is movably disposed in a groove on a rear side of the chassis 101, the ball-collecting frame 301 is detachable from the chassis 101 (for example, a housing is installed on the chassis 101, and the storage space that comes with the housing can be used as a groove on the rear side of the chassis 101, and the ball-collecting frame 301 is directly placed in the storage space of the housing), the lifting tray 302 is movably disposed within the ball-collecting frame 301, four bushings 303 are provided, which are fixed at four corners of the lifting tray 302, respectively, four guide shafts 304 are provided, which are movably threaded in four bushings 303 in one-to-one correspondence, respectively, the guide shafts 304 are fixedly inserted into the ball-collecting frame 301, the guide shafts 304 are movably sleeved with the compression springs 305, the compression springs 305 are located below the bushings 303, the number and size of compression springs 305 sleeving the four guide shafts 304 are the same (for example, four compression springs 305 of the same size are selected and correspondingly sleeve the lower parts of the guide shafts 304 located below the bushings 303), the electromagnetic suction plate 306 is fixed in an opening in a central position of the ball-collecting frame 301, the metal magnetic sheet 307 is fixed at the bottom of the lifting tray 302 in a position above the electromagnetic suction plate 306, four rubber pressure sensor contact pins 308 are provided, which are respectively disposed at the bottom four corners of the ball-collecting frame 301, and the rubber pressure sensor contact pins 308 are disposed in contact with four pressure sensors respectively disposed inside the chassis 101, these four pressure sensors are set up to sense the connection status between the ball-receiving frame 301 and the chassis 101, facilitating the ball-picking work of the robot in the later and ensuring the reliability of the ball-picking operation, the upper and lower multi-layer ball storage structure allows for storing a larger number of balls, the bushing 303 can be a graphite bushing, and the pressure sensor is a resistive thin film pressure sensor.

The connection between the longitudinal mounting bracket 201 and the chassis 101, the transverse mounting bracket 202 and the longitudinal mounting bracket 201, the ball-entering ramp 203 and the chassis 101, the ball-guiding part and the longitudinal mounting bracket 201, the ball-entering motor 205 and the transverse mounting bracket 202, the camera assembly 207 and the transverse mounting bracket 202, the radar 208 and the transverse mounting bracket 202, the bushing 303 and the lifting tray 302, the electromagnetic suction plate 306 and the ball-receiving frame 301, and the metal magnetic sheet 307 and the lifting tray 302 can all be achieved through bolt riveting.

The ball-entering impeller 206 may be clamped to the output shaft of the ball-entering motor 205 using a set screw.

Figure 8:
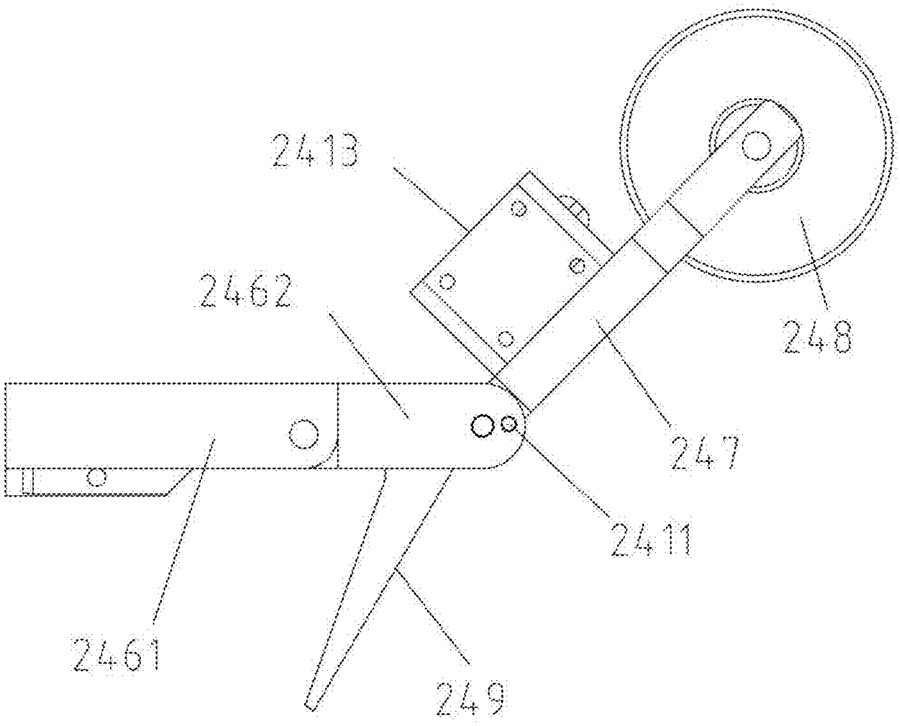
FIG. 8 is a top view of a ball-guiding part according to other embodiments of the present disclosure.
Figure 9:
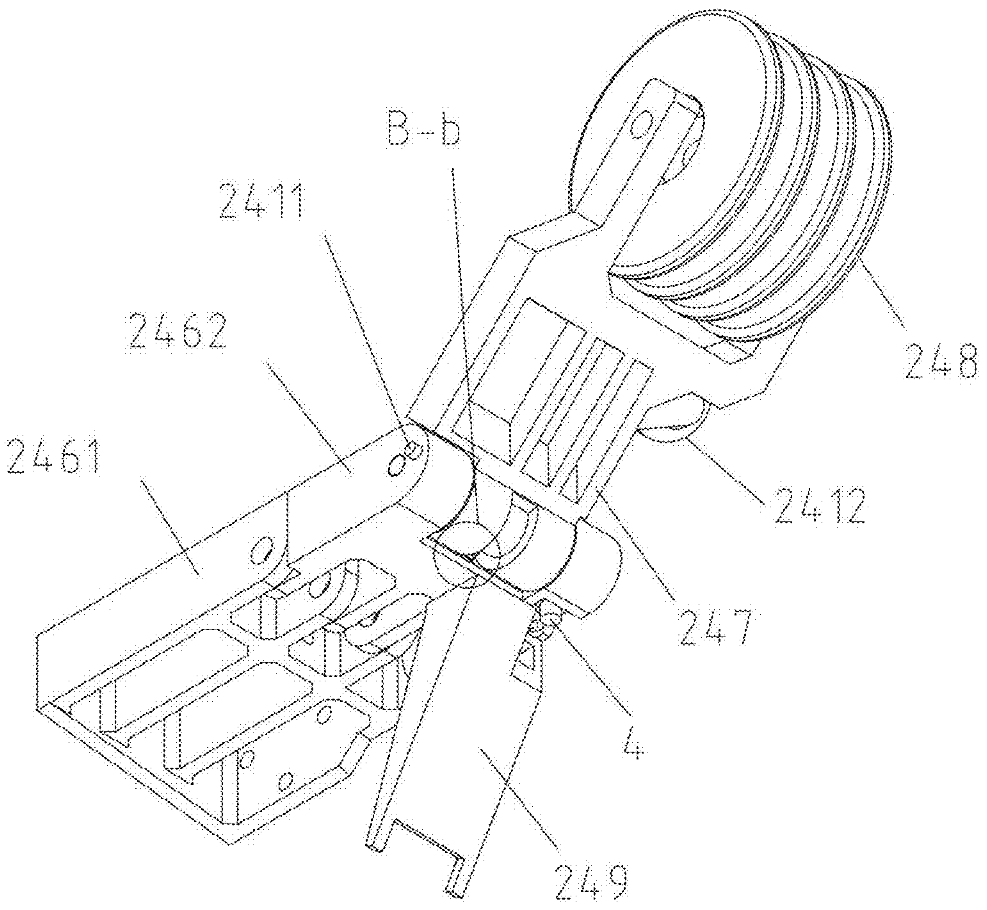
FIG. 9 is a schematic structural diagram of a ball-guiding part according to other embodiments of the present invention.
Figure 10:
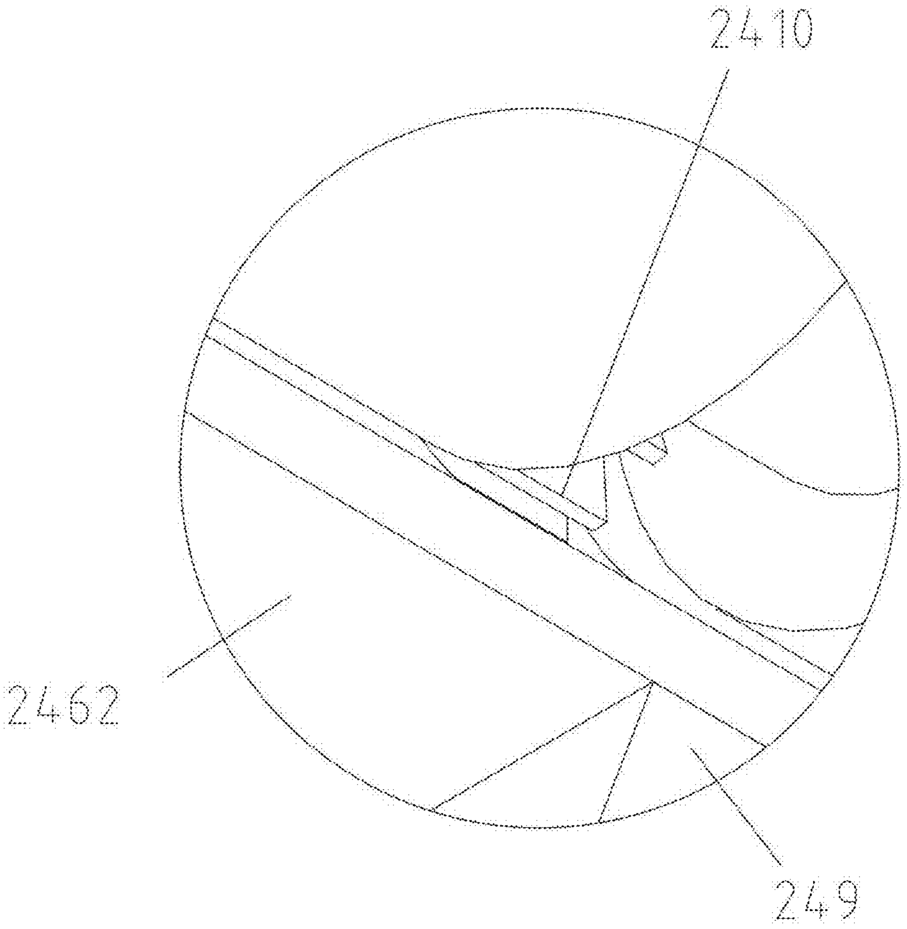
FIG. 10 is an enlarged view of a portion B-b of FIG. 9.

In some specific implementations, please refer to FIGS. 8 to 10, the ball-guiding part may include a connecting bar 246, a movable arm 247 and an auxiliary guiding plate 249. The connecting bar 246 can be connected to the longitudinal mounting bracket 201 by using a connecting piece such as a bolt, and the auxiliary guiding plate 249 is arranged on the inner side wall of the connecting bar 246 to avoid the ball-entering impeller 206 (the sides facing towards each other between the two ball-guiding parts are the inner sides). There is a gap between the bottom surface of the auxiliary guiding plate 249 and the ground. A sensing device 4 (which may be an infrared sensor) is arranged on the inner wall of the lower part of the front side of the connecting bar 246 to avoid the auxiliary guiding plate 249. The position of the sensing device 4 corresponds to the position of the gap. The sensing device 4 senses whether a tennis ball enters between the two ball-guiding parts and controls the working state of the ball-entering impeller 206 through the sensing result of the sensing device 4. The front end of the connecting bar 246 is hinged with the movable arm 247, and the hinged position is provided with a rebound assembly, a limiting assembly and a micro switch 2410, a front end of the movable arm 247 is provided with a side wheel 248, and the micro switch 2410 is connected with the control system.

The specific installation structure of the sensing device 4 may be as follows: the front end of the sensing device 4 does not penetrate the plane where the inner side wall of the auxiliary guiding plate 249 is located, thereby effectively preventing the tennis ball from directly hitting the sensing device 4, and ensuring the service life of the sensing device 4; the connecting bar 246 may be an integral bar-shaped connecting piece or may be a separate bar-shaped connecting piece. For example, the connecting bar 246 includes a first segment 2461 and a second segment 2462 connected with each other, one end of the first segment 2461 is connected with the longitudinal mounting bracket 201, the other end of the first segment 2461 is connected with one end of the second segment 2462, the other end of the second segment 2462 is connected with the rotatable side wheel 248, the second segment 2462 can be connected to the roller 2412 through the auxiliary connecting seat 2413 (or other existing connecting pieces), preferably, a universal wheel is used as the roller 2412, and the setting of the roller 2412 ensures that a support is formed at the bottom of the second segment 2462 without affecting the normal operation of the tennis ball-picking robot, thereby effectively improving the service lives of the second segment 2462 and the side wheel 248. The bottom of the side wheel 248 may also be added with a universal wheel; the rebound assembly may be a torsion spring, the torsion spring sleeves a hinge shaft between the front end of the connecting bar 246 and the movable arm 247, and the two side ends of the torsion spring are respectively connected with the outer side wall of the connecting bar 246 and the outer side wall of the movable arm 247 (the sides facing away from each other between the two ball-guiding parts are the outer sides); and the limiting assembly may include an arc-shaped groove opened at the rear end of the movable arm 247, a pressing column 2411 arranged at the front end of the connecting bar 246, and a spring plunger, the pressing column 2411 is arranged above the spring plunger, and the bottom of the pressing column 2411 is connected with the top of the spring plunger, the bottom of the spring plunger penetrates the connecting bar 246 and extends into the arc-shaped groove, and the spring plunger can slide along the arc-shaped groove with the rotation of the movable arm 247; the limiting assembly can also directly adopt other existing structures that can limit the rotation angle of the movable arm 247.

When the ball-guiding part is in the working state, a telescopic end of the spring plunger can only move in the arc-shaped groove, thereby controlling the moving angle of the movable arm 247, the movable arm 247 can be turned to the outside by a certain angle when the front of the movable arm 247 is impacted to trigger the micro switch 2410, and then the tennis ball-picking robot can be controlled to retreat and adjust the direction by the control system. When the movable arm 247 hits the wall from the oblique direction, the movable arm 247 will not turn to the inside, and the side wheel 248 will adjust the tennis ball-picking robot to stick to the wall forward along the wall, so as to facilitate the collection of the tennis ball by the wall. When the ball-guiding part is in a non-working state, the pressing column is pressed to contract the telescopic end of the spring plunger from the arc-shaped groove. At this time, the angle of the movable arm 247 can be adjusted to conveniently accommodate the movable arm 247.

Figure 4:
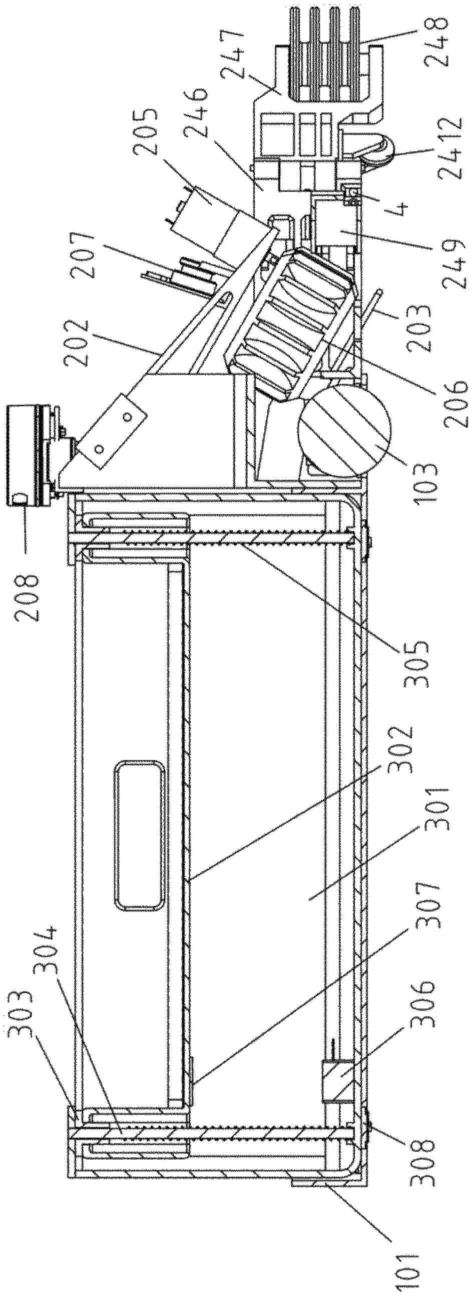
FIG. 4 is a cross-sectional view taken along a direction A-A of FIG. 3.
Figure 5:
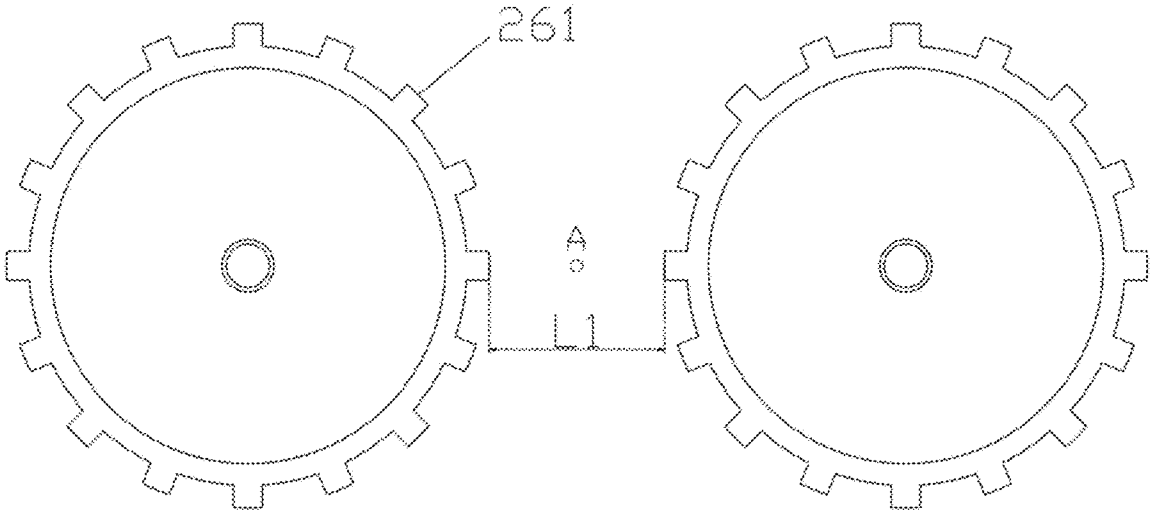
FIG. 5 is a schematic diagram of one state of two ball-entering impellers according to some embodiments of the present disclosure.
Figure 6:
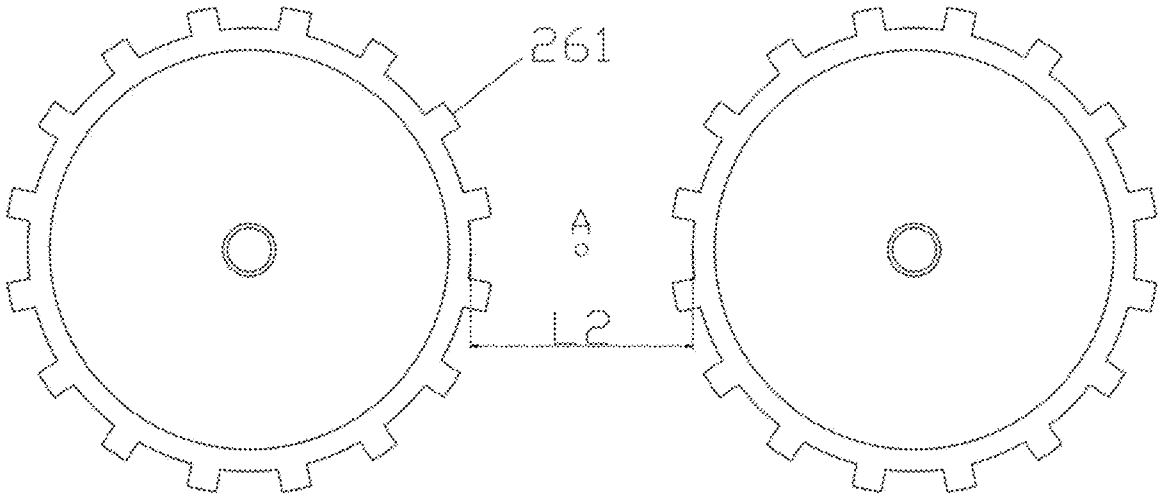
FIG. 6 is a schematic diagram of another state of two ball-entering impellers according to some embodiments of the present disclosure.
Figure 7:
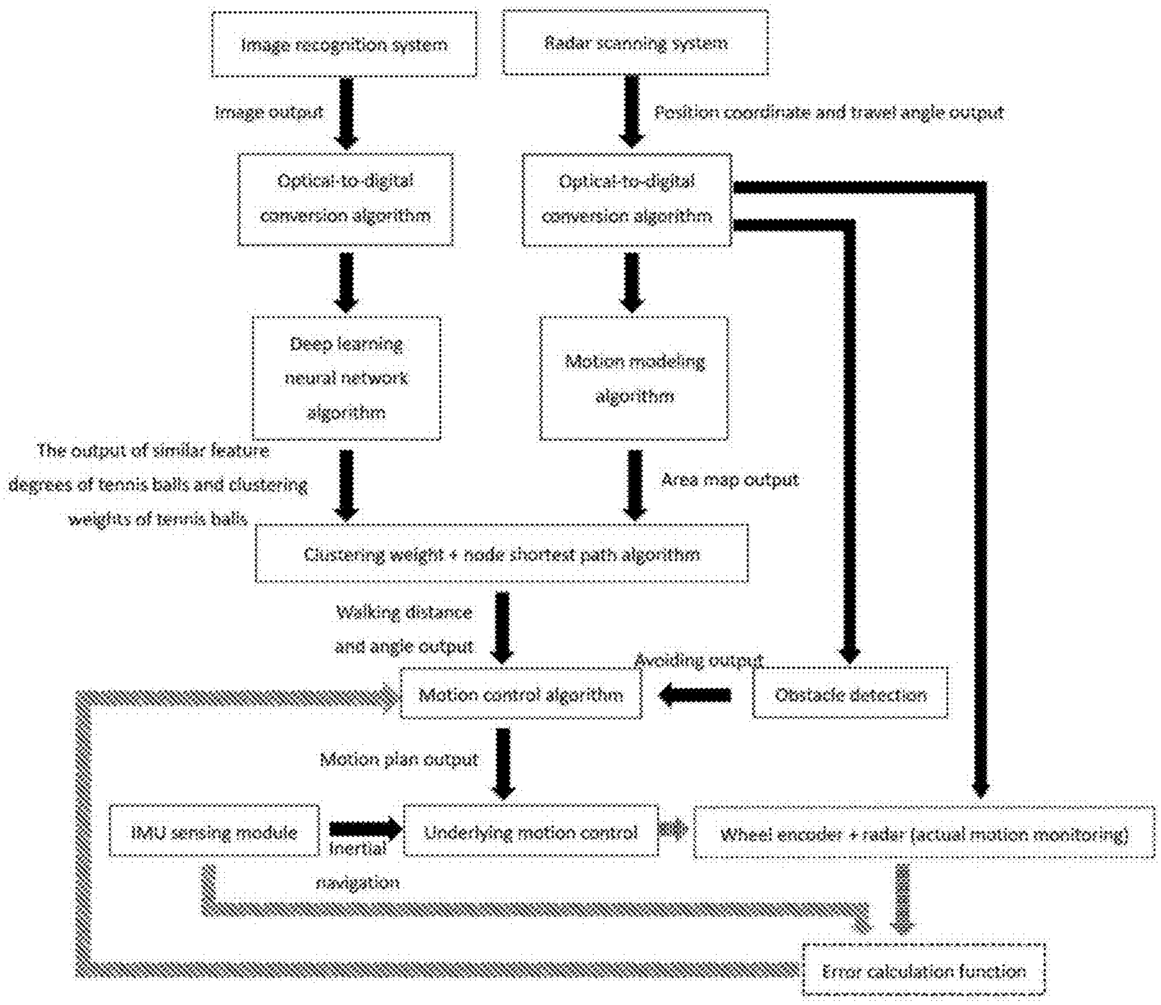
FIG. 7 is a control flow diagram illustrating the working principle of the tennis ball-picking robot according to some embodiments of the present disclosure.

Referring to FIG. 4, the ball-entering impeller 206 is designed in a recess shape between the blades, for example, referring to FIGS. 4 and 5, a plurality of blades 261 are circumferentially and equidistantly distributed outside the body of the ball-entering impeller, a midpoint between the right and left ball-entering impellers 206 is set as a midpoint A, the two ball-entering impellers 206 are symmetrically distributed about the midpoint A, a distance between the blades 261 of the left ball-entering impeller 206 and the blades 261 of the right ball-entering impeller 206 is greater than or equal to 62 mm; the distance between recesses of the left ball-entering impeller 206 and recesses of the right ball-entering impeller 206 is greater than or equal to 68 mm. In some specific implementations, the blade 261 on the left ball-entering impeller 206 near the midpoint A is on the same plane as the blade 261 on the right ball-entering impeller 206 near the midpoint A when the blade 261 on the left ball-entering impeller 206 and the corresponding blade 261 on the right ball-entering impeller 206 run to their closest positions, and the distance L1 between the two blades is 62 mm; when the center of the recess of the left ball-entering impeller 206 and the center of the corresponding recess on the right ball-entering impeller 206 run to their closest positions, the center of the recess on the left ball-entering impeller 206 near the midpoint A, the center of the recess on the right ball-entering impeller 206 near the midpoint A, and the midpoint A are on the same plane, and the distance L2 between the center of the recess on the left ball-entering impeller 206 near the midpoint A and the center of the recess on the right ball-entering impeller 206 near the midpoint A is 68 mm. The aforementioned recess design between the blades can trap the tennis balls between adjacent blades of the ball-entering impellers during the ball-entering process, preventing the balls from being squeezed and ensuring the overall stability of the equipment. When the impeller rotates at high speed, it drives the air flow, creating a negative pressure between the two impellers, which in turn sucks the tennis balls inward during the ball-entering process, ensuring smooth ball entry.

The tennis ball-picking robot may further include a power module, the power module being connected with the control system.

The tennis ball-picking robot includes a control system, and the ball-entering motors 205, the radar 208, the camera assembly 207, the pressure sensors, the electromagnetic suction plate 306, and the driving wheel sets 103 are all connected with the control system. In addition, contact electrification can be adopted between the ball-collecting frame 301 and the chassis 101 to facilitate the electrical connection between the electromagnetic suction plate 306 on the ball-collecting frame 301 and the control system.

The control system can also form a wired or wireless connection with the display assembly, which can be a smartphone, laptop, or other smart devices with a display screen. The corresponding APP function allows users to select the ball-picking area and ball-picking speed mode of the robot, as well as provides a virtual court and the distribution of balls on the court, helping players analyze ball paths and so on.

The control system includes a data processing module that acquires field data and the clustered state of scattered tennis balls on the site through the camera assembly 207 and radar 208, and then plans the current ball-picking path for the tennis ball-picking robot. Based on the current ball-picking path for the tennis ball-picking robot, the control system controls the operation of the walking assembly.

The radar 208 may be a lidar, and the bottom of the radar 208 may be equipped with a conventional rotating mechanism to rotate the radar 208 as required.

The camera in the camera assembly 207 may be an RGB camera.

In some specific implementations, the control system further includes an image recognition system connected with the data processing module, a radar scanning system and a driving system, the image recognition system is connected with the camera assembly 207, the radar scanning system is connected with the radar 208, and the driving system is connected with the driving wheel set 103, the image recognition system is used for controlling the working state and the photographing angle of the camera assembly 207, acquiring the images acquired by the camera assembly 207, filtering the images and outputting the image containing the tennis ball to the data processing module; the radar scanning system is used for controlling the operating state of the radar 208, acquiring the information scanned by the radar 208, outputting the scanned various types of data to the data processing module; the data processing module constructs a model and outputs a corresponding map (which can be formed as a two-dimensional or three-dimensional map as required); and the driving system is used for performing underlying motion control, specifically controlling the operation of the driving wheel set 103 based on the motion plan.

The data processing module can also be used to store relevant parameters of the tennis ball, and the relevant parameters include the shape, size, color of the tennis ball.

The tennis ball-picking robot has one or more of the following functions: following operation, mapping and localization, and path planning, which can be implemented directly in combination with many existing AI technologies such as computer vision, simultaneous localization and mapping, robot kinematics.

When the tennis ball-picking robot starts to pick up the ball, the electromagnetic suction plate 306 is controlled to be energized, and the lifting tray 302 is pressed down by the user's hand to retract the compression spring 305, so that the metal magnetic sheet 307 is attached to the electromagnetic suction plate 306, and the electromagnetic suction plate 306 attracts the metal magnetic sheet 307 to prevent the compression spring 305 from rebounding.

Taking that the tennis ball-picking robot has the functions of mapping and localization and path planning as an example, the operation principle of the tennis ball-picking robot described above may be: during the initial data collection phase, the tennis ball-picking robot walks in the field along a pre-planned path (or a walking path input through the display assembly). During walking, the image recognition system and radar scanning system control the radar 208 and camera module 207 respectively to continuously work for data acquisition (scanning and image acquisition of the field and obstacles in the field) until the entire field has been traversed; field modeling, which facilitates mapping and localization, can be performed in real-time during the initial data collection process or be performed after data collection is finalized. The data processing module retrieves the operational outcomes from the image recognition system and radar scanning system, and employs an optical-to-digital conversion algorithm and a motion modeling algorithm to construct a model for modeling processing to yield a model corresponding to the field and a corresponding coordinate system. If there is a display assembly connected with the tennis ball-picking robot at this time, the two-dimensional or three-dimensional map corresponding to the model can be sent to the display assembly for display, the modeling method can be directly implemented by using prior art, and therefore will not be described in detail herein; Obstacles within the field are marked on the model. Based on the scanning results from the radar 208, the optical-to-digital conversion algorithm is applied to detect the obstacles, and the detected obstacles are then marked accordingly.

The tennis balls among the marked obstacles are specifically marked, in combination with pre-stored relevant parameters of the tennis balls, the optical-to-digital conversion algorithm and deep learning neural network algorithm are utilized, similar features of tennis balls and their clustering weights are output. Subsequently, these clustering weights are combined with the node shortest path algorithm, along with the model and localization information, to perform path planning, trajectory operation instructions (including a walking distance and angle) are output, a motion plan is then output by a motion control algorithm module to determine parameters such as the direction, distance, and speed of movement. During the execution of the node shortest path algorithm, areas where balls are clustered are prioritized as key points for the path planning.

The instructions containing parameters such as movement direction, distance, and speed are transmitted to the underlying motion control of the tennis ball-picking robot. These instructions then control the driving assemblies (including a driving controller, the driving wheel sets, etc.) to initiate the ball-picking operation. Drive equipment operates based on the planned positions and forms closed-loop adjustment with real-time localization feedback signals to complete the motion control. This enables the robot to accurately reach the ball-picking point and effectively avoid obstacles along the path.

The specific ball-picking operation process of the tennis ball-picking robot is: the driving wheel sets 103 drive the tennis ball-picking robot to move close to the tennis ball, when the sensing device 4 senses a tennis ball, the ball-entering motors 205 are started, the ball-entering motors 205 drive the right and left corresponding ball-entering impellers 206 to rotate inward simultaneously, the tennis balls are transmitted through the ball-entering impellers 206, and guided by the ball-entering ramp 203 into the lifting tray 302. The rubber pressure sensor contact pins 308 contact the resistive thin film pressure sensors. When the collected balls reach the weight limit, the electromagnetic suction plate 306 is triggered to be de-energized, allowing the compression springs 305 to rebound and driving the lifting tray 302 to lift. Subsequently, the continuously received tennis balls accumulate at the bottom of an inner cavity of the ball-collecting frame 301. Once a certain weight is reached or the collection is complete, the ball-collecting frame 301 can be lifted to empty the balls.

On the driving wheel set 103 mentioned above, a wheel motor encoder can be added to integrate with a vehicle IMU sensor system. This integration allows for the acquisition of the vehicle's actual motion data. By comparing the actual motion data with the planned motion data, an error function is calculated. This error function is then applied to the motion control algorithm to optimize the motion planning, enabling real-time adjustment and optimization of the underlying motion control. This closed-loop adjustment ensures that the robot can accurately reach the ball-picking point to pick up the ball and effectively avoid obstacles along the path.

The tennis ball-picking robot can perform real-time localization during its movement. When new obstacles (including tennis balls) enter the data acquisition range of both the radar 208 and the camera module 207 within the field, the tennis ball-picking robot can utilize the data collected by the radar 208 and the camera module 207, along with the current position information of the tennis ball-picking robot, to construct a corresponding model for these new obstacles on a model corresponding to the field.

The following operation described above can be directly implemented using existing following programs with existing devices having identification information such as cell phones, smart bands, etc. as the following objects.

The above-mentioned ball-guiding parts may also be other existing devices capable of achieving the same function.

All things not disclosed above can be implemented in the prior art and will not be described in detail herein.

Although the embodiments of the present disclosure have been illustrated and described, it would be appreciated by those of ordinary skill in the art that various changes, modifications, substitutions and variations may be made in these embodiments without departing from the principles and spirit of the disclosure, the scope of which is defined in the appended claims and their equivalents.

What is claimed is:

1. A tennis ball-picking robot, comprising a chassis assembly (100), a ball-entering control element group (200) and a ball-collecting mechanism (300), the ball-entering control element group (200) being disposed on a front end of the chassis assembly (100) and the ball-collecting mechanism (300) being disposed on a rear side of the chassis assembly (100), the chassis assembly (100) comprising a walking assembly that moves the tennis ball-picking robot through the chassis assembly (100), wherein the tennis ball-picking robot comprises a control system, the ball-entering control element group (200) comprises a longitudinal mounting bracket (201), a transverse mounting bracket (202), a ball-entering ramp (203), ball-guiding parts, ball-entering motors (205), and ball-entering impellers (206), the longitudinal mounting bracket (201) is fixed on the chassis assembly (100), the transverse mounting bracket (202) is fixed at a front upper end of the longitudinal mounting bracket (201), the ball-entering ramp (203) is arranged inside the longitudinal mounting bracket (201), and the ball-entering ramp (203) is fixed with the chassis assembly (100), two ball-guiding parts are provided, which are fixed left and right on two sides of the longitudinal mounting bracket (201), respectively, two ball-entering motors (205) are provided, which are fixed left and right on the transverse mounting bracket (202), respectively, and output shafts of the ball-entering motors (205) are extended under the longitudinal mounting bracket (201) after passing through through holes in the longitudinal mounting bracket (201), respectively, and two ball-entering impellers (206) are provided, which are fixed with the output shafts of the ball-entering motors (205) arranged left and right, respectively, and the ball-entering motors (205) are connected with the control system; and each ball-entering impeller (206) is designed in a recess shape between blades, and a plurality of blades are equidistantly distributed on the outside of the ball-entering impeller.

2. The tennis ball-picking robot according to claim 1, wherein the ball-entering control element group (200) and the ball-collecting mechanism (300) are connected with the control system; and the tennis ball-picking robot further comprises a display assembly connected with the control system.

3. The tennis ball-picking robot according to claim 2, wherein the ball-entering control element group (200) comprises a camera assembly (207) and a radar (208), the camera assembly (207) is fixed at an upper front end of the transverse mounting bracket (202), the radar (208) is fixed at a top end of the transverse mounting bracket (202), both the radar (208) and the camera assembly (207) are connected with the control system; the tennis picking robot has one or more of the following functions: follow-up operation, mapping and localization, and path planning; and the control system comprises a data processing module, the data processing module collects data of a field and obstacles on the field through the camera assembly (207) and the radar (208), analyzes the data to acquire the clustered state of scattered tennis balls on a site, and plans a current ball-picking path for the tennis ball-picking robot, and the control system controls the walking assembly to operate according to the current ball-picking path for the tennis ball-picking robot.

4. The tennis ball-picking robot according to claim 1, wherein the ball-entering control element group (200) comprises a camera assembly (207) and a radar (208), the camera assembly (207) is fixed at an upper front end of the transverse mounting bracket (202), the radar (208) is fixed at a top end of the transverse mounting bracket (202), both the radar (208) and the camera assembly (207) are connected with the control system; the tennis picking robot has one or more of the following functions: follow-up operation, mapping and localization, and path planning; and the control system comprises a data processing module, the data processing module collects data of a field and obstacles on the field through the camera assembly (207) and the radar (208), analyzes the data to acquire the clustered state of scattered tennis balls on a site, and plans a current ball-picking path for the tennis ball-picking robot, and the control system controls the walking assembly to operate according to the current ball-picking path for the tennis ball-picking robot.

5. The tennis ball-picking robot according to claim 1, wherein a midpoint between the two ball-entering impellers (206) is set as a midpoint A, the two ball-entering impellers (206) are symmetrically distributed about the midpoint A, a distance between blades on the two ball-entering impellers (206) is greater than or equal to 62 mm; the distance between recesses of the two ball-entering impellers (206) is greater than or equal to 68 mm; and the ball-guiding part comprises a second connecting bar (246), a movable arm (247) and an auxiliary guiding plate (249), wherein a rear side of the second connecting bar (246) is provided with a reserved hole (242), and a bolt passes through the reserved hole (242) and is inserted into the longitudinal mounting bracket; the auxiliary guiding plate (249) is arranged on the second connecting bar (246) to avoid the ball-entering impeller (206), and a lower part of a front side of the second connecting bar (246) is provided with a sensing device (4) to avoid the auxiliary guiding plate (249), a front end of the second connecting bar (246) is hinged with the movable arm (247), and a hinged position is provided with a rebound assembly, a limiting assembly and a micro switch (2410), a front end of the movable arm (247) is provided with a side wheel (248), and the micro switch (2410) is connected with the control system.

6. The tennis ball-picking robot according to claim 5, wherein the limiting assembly comprises an arc-shaped groove opened at a rear end of the movable arm (247), a pressing column (2411) arranged at the front end of the second connecting bar (246), and a spring plunger, the pressing column (2411) is arranged above the spring plunger, the bottom of the pressing column (2411) is connected with the top of the spring plunger, and the bottom of the spring plunger penetrates the second connecting bar (246) and extends into the arc-shaped groove; and the movable arm (247) is provided with a roller (2412).

7. The tennis ball-picking robot according to claim 2, wherein the ball-collecting mechanism (300) comprises a ball-collecting frame (301), a lifting tray (302) and a lift control assembly, both the lifting tray (302) and the lift control assembly being disposed within the ball-collecting frame (301), the lift control assembly being used for controlling lifting and lowering of the lifting tray (302), the lift control assembly being connected with the control system.

8. The tennis ball-picking robot according to claim 7, wherein the lift control assembly comprises bushings (303), guide shafts (304), compression springs (305), an electromagnetic suction plate (306), a metal magnetic sheet (307), and rubber pressure sensor contact pins (308), the lifting tray (302) is movably disposed within the ball-collecting frame (301), four bushings (303) are provided, which are fixed at four corners of the lifting tray (302), respectively, four guide shafts (304) are provided, which are movably threaded in four bushings (303) in one-to-one correspondence, respectively, the guide shafts (304) are fixed on the ball-collecting frame (301), the guide shafts (304) are movably sleeved with the compression springs (305), the compression springs (305) are located below the bushings (303), the electromagnetic suction plate (306) is fixed in an opening in a central position of the ball-collecting frame (301), the metal magnetic sheet (307) is fixed at the bottom of the lifting tray (302) in a position above the electromagnetic suction plate (306), four rubber pressure sensor contact pins (308) are provided, which are respectively disposed at the bottom four corners of the ball-collecting frame (301), and the rubber pressure sensor contact pins (308) are disposed in contact with four pressure sensors respectively disposed inside the chassis assembly (100), the pressure sensors and the electromagnetic suction plate (306) are connected with the control system.

9. The tennis ball-picking robot according to claim 7, wherein the ball-collecting frame (301) is movably disposed in a groove on a rear side of the chassis assembly (100), the ball-collecting frame (301) is detachable from the chassis assembly (100); the number and size of compression springs (305) sleeving the four guide shafts (304) are the same; the bushing (303) is a graphite bushing; and the pressure sensor is a resistive thin film pressure sensor.

10. The tennis ball-picking robot according to claim 8, wherein the ball-collecting frame (301) is movably disposed in a groove on a rear side of the chassis assembly (100), the ball-collecting frame (301) is detachable from the chassis assembly (100); the number and size of compression springs (305) sleeving the four guide shafts (304) are the same; the bushing (303) is a graphite bushing; and the pressure sensor is a resistive thin film pressure sensor.

11. The tennis ball-picking robot according to claim 2, wherein the chassis assembly (100) comprises a chassis (101), the walking assembly comprises driving wheel sets (103), two driving wheel sets (103) are provided, which are arranged left and right at a front end of the chassis (101), respectively, and the driving wheel set (103) is connected with the control system; and the tennis ball-picking robot comprises a power supply module, and the power supply module is connected with the control system.

* * * * *